(12) United States Patent
Benedetti (10) Patent No.: US 10,704,577 B2
(45) Date of Patent: Jul. 7, 2020

(54) U-BASE FASTENER WITH FOLDED BARB

(71) Applicant: Newfrey LLC, New Britain, CT (US)

(72) Inventor: Steven M. Benedetti, Sterling Heights, MI (US)

(73) Assignee: Newfrey LLC, New Britain, CT (US)

( * ) Notice: Subject to any disclaimer, the term of this patent is extended or adjusted under 35 U.S.C. 154(b) by 79 days.

(21) Appl. No.: 15/787,288

(22) Filed: Oct. 18, 2017

(65) Prior Publication Data

US 2019/0113060 A1 Apr. 18, 2019

(51) Int. Cl.
| | |
|---|---|
| *F16B 2/22* | (2006.01) |
| *F16B 21/07* | (2006.01) |
| *B60R 13/00* | (2006.01) |
| *B60R 13/02* | (2006.01) |

(52) U.S. Cl.
CPC .............. *F16B 2/22* (2013.01); *F16B 21/075* (2013.01); *B60R 13/005* (2013.01); *B60R 13/02* (2013.01)

(58) Field of Classification Search
CPC ........ F16B 2/22; F16B 21/075; F16B 5/0614; F16B 5/0657; B60R 13/02; B60R 13/005; Y10T 24/304; Y10T 24/307; Y10T 24/30
See application file for complete search history.

(56) References Cited

U.S. PATENT DOCUMENTS

| | | | |
|---|---|---|---|
| 2,607,971 A | 8/1952 | Bedford, Jr. | |
| 2,825,948 A | 3/1958 | Parkin | |
| 3,525,129 A | 8/1970 | Holton | |
| 3,673,643 A | 7/1972 | Kindell | |
| 4,402,118 A * | 9/1983 | Benedetti | F16B 5/065 24/289 |
| 4,644,612 A * | 2/1987 | Osterland | F16B 5/065 24/289 |
| 4,683,622 A | 8/1987 | Oehlke | |
| 5,314,280 A | 5/1994 | Gagliardi et al. | |
| 5,373,611 A | 12/1994 | Murata | |
| 5,422,789 A | 6/1995 | Fisher et al. | |
| 5,542,158 A | 8/1996 | Gronau et al. | |

(Continued)

FOREIGN PATENT DOCUMENTS

| | | |
|---|---|---|
| BE | 632590 A | 5/1963 |
| CA | 496700 A | 10/1953 |

(Continued)

OTHER PUBLICATIONS

Extended European Search Report dated Feb. 22, 2019 in corresponding European Patent Application No. EP18193923.

*Primary Examiner* — Robert Sandy
*Assistant Examiner* — Rowland Do
(74) *Attorney, Agent, or Firm* — Harness, Dickey & Pierce, P.L.C.

(57) ABSTRACT

A resilient U-base fastener includes a U-shaped body defining a central cavity between first and second sides. The fastener has an insertion end with the first and second sides extending therefrom to a trailing end. The fastener includes a first barb extension extending outwardly from one of the lateral side edges of the first side. The first barb extension is bent to support a first barb in the central cavity. The fastener also includes a second barb extension extending outwardly from a lateral side edge of the first side opposite the first barb extension. The second barb extension is bent to support a second barb in the central cavity.

20 Claims, 7 Drawing Sheets

(56) References Cited

U.S. PATENT DOCUMENTS

| | | | |
|---|---|---|---|
| 5,774,949 A | 7/1998 | Cornell et al. | |
| 6,141,837 A | 11/2000 | Wisniewski | |
| 6,279,207 B1 | 8/2001 | Vassiliou | |
| 6,691,380 B2* | 2/2004 | Vassiliou | F16B 5/0614 24/289 |
| 6,796,006 B2 | 9/2004 | Hansen | |
| 6,928,705 B2* | 8/2005 | Osterland | B60R 13/0206 24/289 |
| 7,051,408 B2 | 5/2006 | De Azevedo et al. | |
| 7,676,893 B2* | 3/2010 | Gibbons | B60N 3/026 24/289 |
| 8,370,999 B2 | 2/2013 | Camus | |
| 9,080,588 B2* | 7/2015 | Diez Herrera | F16B 21/075 |
| 2002/0104201 A1* | 8/2002 | Smith | F16B 5/0614 24/293 |
| 2002/0194710 A1 | 12/2002 | Dickinson et al. | |
| 2004/0083582 A1* | 5/2004 | Dickinson | F16B 5/0614 24/295 |
| 2005/0105987 A1* | 5/2005 | Giugliano | F16B 5/065 411/508 |
| 2005/0271492 A1* | 12/2005 | Jackson, Jr. | F16B 21/076 411/112 |
| 2006/0117536 A1 | 6/2006 | Smith | |
| 2008/0271297 A1* | 11/2008 | Dubost | B60R 13/0206 24/293 |
| 2013/0340216 A1 | 12/2013 | Smith et al. | |
| 2015/0076304 A1 | 3/2015 | Hattori | |

FOREIGN PATENT DOCUMENTS

| | | |
|---|---|---|
| EP | 0899466 A1 | 3/1999 |
| EP | 1482184 A2 | 12/2004 |
| GB | 1171363 A | 11/1969 |
| WO | WO 02/070905 A2 | 9/2002 |

* cited by examiner

U-BASE FASTENER WITH FOLDED BARB

FIELD

The present disclosure relates to fasteners and more particularly to U-based resilient fasteners.

BACKGROUND

This section provides background information related to the present disclosure which is not necessarily prior art.

Various types of fasteners are often used to connect mating components in products, vehicles, and other environments. One type of fastener is a U-base fastener. U-base fasteners (or U-base clips) are of particular use to easily attach two mating components to one another. One component typically has a feature such as a rib that is received into the U-base fastener and the rib is secured within the U-base fastener. The component can then be secured to a second component by inserting the U-base fastener into an opening in the second component. A barb or other feature of the U-base clip typically retains the rib inside the U-base fastener and other elements of the U-base clip secure the U-base clip in the opening in the second component.

One application for U-base clips is in the context of securing components at a desired location in a vehicle. Such components in vehicles can include interior trim components, exterior trim components, fascia components and various other covers, ornamentation and the like. In these and other applications, the insertion force required to insert the rib into the U-base fastener and the insertion force required to insert the U-base fastener into the opening are important characteristics. The retention force, the force required to remove the U-base fastener from the opening, is also an important characteristic. Other characteristics of U-base fasteners are also important, including the size of the fastener, the ability to use the fastener in variety of applications, the ease and efficiency of manufacturing the fastener, the reliability and durability of the fastener, the cost of the fastener and others.

SUMMARY

This section provides a general summary of the disclosure, and is not a comprehensive disclosure of its full scope or all of its features.

One example resilient U-base fastener in accordance with the present disclosure can include a U-shaped body defining a central cavity between a first side and a second side. The first side is connected to the second side at an insertion end and the first side has a first lateral side edge and a second lateral side edge. The second side having a third lateral side edge and a fourth lateral side edge. The U-base fastener also includes a first barb extension extending outwardly from the first lateral side edge that is bent to support a first barb in the central cavity. The first barb extends inwardly and toward the insertion end and at least a portion of the first barb is positioned between the first lateral side edge and the second lateral side edge of the first side. The U-base fastener also includes a second barb extension extending outwardly from the second lateral side edge that is bent to support a second barb in the central cavity. The second barb extends inwardly and toward the insertion end and at least a portion of the second barb is positioned between the first lateral side edge and the second lateral side edge of the first side. The U-base fastener also includes a first spring arm connected to the body adjacent to the insertion end that extends outwardly from the second side and away from the central cavity.

Another example U-base fastener in accordance with the present disclosure includes a U-shaped body defining a central cavity between a first side and a second side. The first side is connected to the second side at an insertion end. The fastener also includes a first pair of barb extensions extending outwardly from opposite lateral side edges of the first side. The first pair of barb extensions are bent to support a first pair of barbs in the central cavity. The fastener further includes a second pair of barb extensions extending outwardly from opposite lateral side edges of the second side. The second pair of barb extensions are bent to support a second pair of barbs in the central cavity. The fastener also includes a first spring arm connected to the body adjacent to the insertion end and extending outwardly from the first side and away from the central cavity and a second spring arm connected to the body adjacent to the insertion end and extending outwardly from the second side and away from the central cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
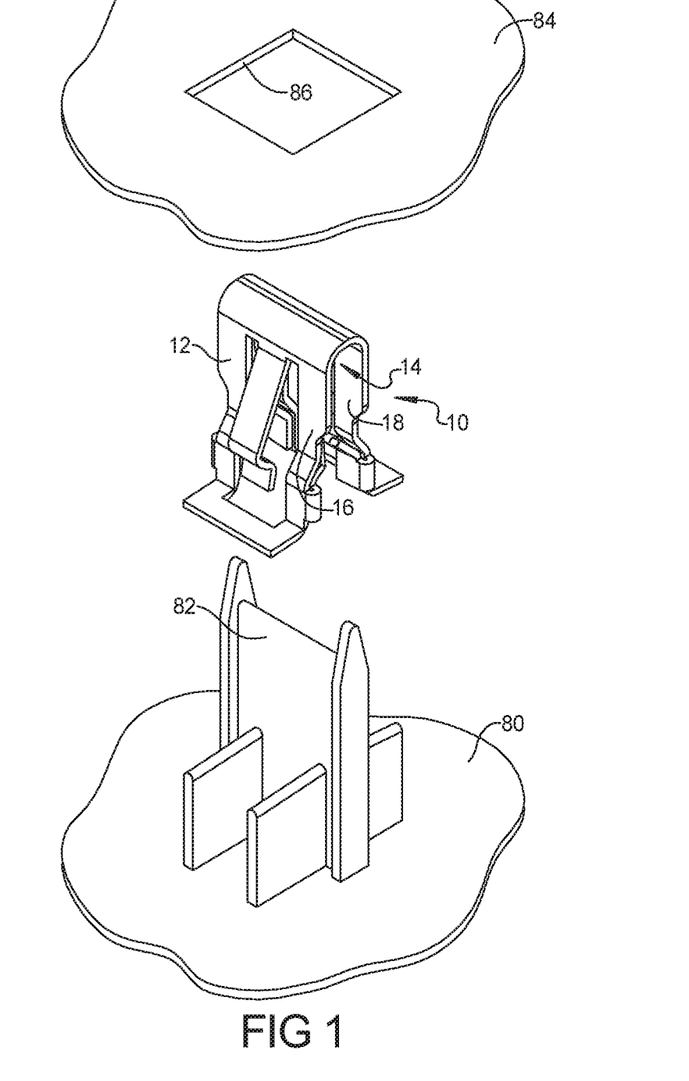
FIG. 1 is a partial exploded view of one example fastener with a first component and a second component secured thereby in accordance with the present disclosure.

FIGS. 1-6 show one example embodiment of a U-base fastener in accordance with the present disclosure. A fastener 10 includes a body 12 with a first side 16 and a second side 18. FIG. 1 shows the example fastener 10 connected to a first component 80 with a rib 82. As will be explained, one or more barbs secure the fastener 10 to the rib 82. After the fastener 10 is secured to the rib 82, the first component 80 can be connected to a second component 84 by inserting the fastener 10 into an opening 86 in the second component 84. In this manner, the first component 80 is secured to the second component 84.

Referring now to FIGS. 2-6, the body 12 of the fastener 10, in this example, is U-shaped and includes an insertion end 20 with a rounded profile connecting the first side 16 to the second side 18. The body 12 extends away from an insertion end 20 along the first side 16 and the second side 18 toward a trailing end 22. The first side 16 has two lateral side edges 24 that extend on the edges of the first side 16 from the insertion end 20 to the trailing end 22. Similarly, the second side 18 also has two lateral side edges 24 that extend along the edges of the second side 18 from the insertion end 20 to the trailing end 22. At the trailing end 22, the first side 16 and the second side 18 each can turn outward and can form a first flange 26 at the first side 16 and a second flange 28 at the second side 18. In this example, the first flange 26 spans the width of the body 12 on the first side 16 and the second flange 28 spans the width of the body 12 on the second side 18.

As can be seen, this structure of the body 12 forms a central cavity 14 that is located between the first side 16 and the second side 18. As can be appreciated and as shown in FIG. 1, the rib 82 fits into the central cavity 14. The insertion end 20 can then be inserted into the opening 86 of the second component 84. The opening 86 in the second component 84 has a width that is smaller than the distance between an outer edge 30 of the first flange 26 and an outer edge 32 of the second flange 28. With this relative sizing, the fastener 10 is not permitted to pass through the opening 86. The first flange 26 and the second flange 28 of the fastener 10 seat on an outer surface of the second component 84.

Figure 2:
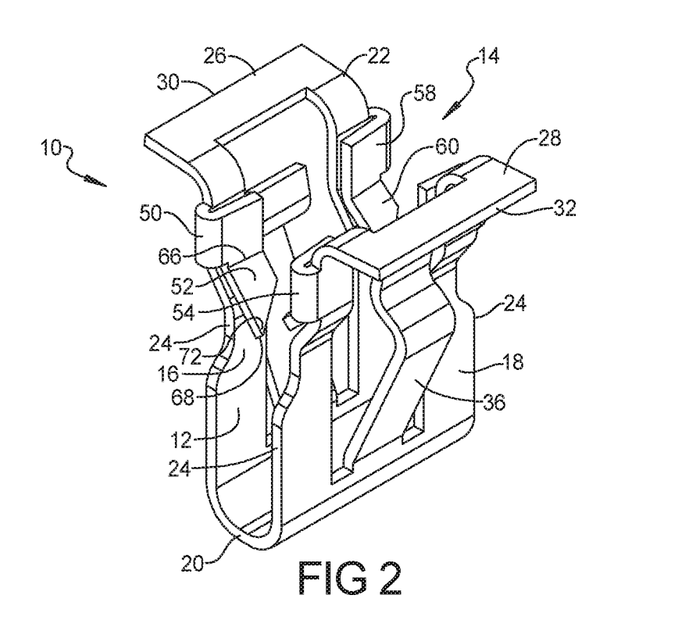
FIG. 2 is a perspective view of the fastener shown in FIG. 1.
Figure 3:
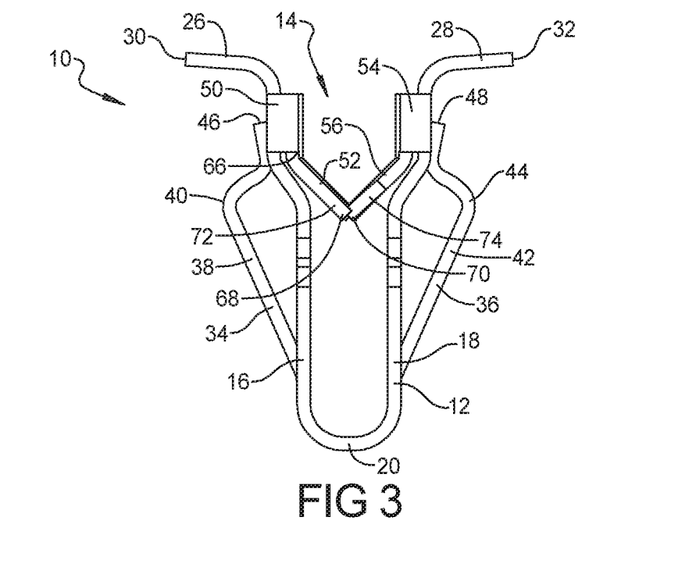
FIG. 3 is a side view of the fastener shown in FIG. 1.

The fastener 10 is retained in the opening 86 of the second component 84 by one of more spring arms such as, a first spring arm 34 and a second spring arm 36 in this example. In other examples, the fastener 10 can include a single spring arm. In the example shown, the fastener 10 includes two spring arms located on opposite sides of the fastener 10. As can be seen in FIGS. 2 and 3, the first spring arm 34 and the second spring arm 36 are located between the lateral side edges 24 of the body 12. The first spring arm 34 is connected to the body 12 at or near the insertion end 20 and extends outward from the first side 16 and away from the insertion end 20. The first spring arm 34 extends outward and away along elongated portion 38 until the first spring arm 34 bends back toward the first side 16 at a first shoulder 40. The first spring arm 34 then bends again and follows a direction generally more parallel to the first side 16 before stopping at a terminating end 46 located under the first flange 26 at a trailing end 22 of the fastener 10.

The second spring arm 36 can be disposed on the opposite side of the fastener 10 and is substantially symmetrical to the first spring arm 34 as shown in FIG. 3. The second spring arm 36 can be connected to the second side 18 at or near the insertion end 20 and extends away from the insertion end 20 and outwardly from the second side 18. The second spring arm 36 includes an elongated portion 42 that can be oriented at an acute angle to the second side 18 before bending back toward the second side 18 at a second shoulder 44.

The first spring arm 34 and the second spring arm 36 are able to flex such that the first spring arm 34 and the second spring arm 36 can move inwardly relative to the first side 16 and the second side 18, respectively. When the fastener 10 is inserted into the opening 86 in the second component 84, the first spring arm 34 and the second spring arm 36 flex when they contact the edges of the opening 86 and move inward toward the central cavity 14. After passing through the opening 86, the first spring arm 34 and the second spring arm 36 flex back outward toward their original positions. The first shoulder 40 and the second shoulder 44 move outward and retain the fastener 10 to the second component 84. When installed, the thickness of the material of the second component is captured between the first shoulder 40 and the first flange 26 of the first side 16 and between the second shoulder 44 and the second flange 28 of the second side 18.

As further shown in FIGS. 2 and 3, the fastener 10 also includes at least one barb extension and at least one barb. In one example, the fastener 10 includes a first barb extension 50, a second barb extension 58, a third barb extension 54, a fourth barb extension 62, a first barb 52, a second barb 60, a third barb 56 and a fourth barb 64. In this example, each of the four barb extensions and each of the four barbs is similar to one another. The first barb extension 50 and the first barb 52 are hereinafter described but it should be appreciated that the other barb extensions and the other barbs can have a similar structure and can be symmetrically disposed or mirrored on an opposite side of the fastener 10.

Figure 5:
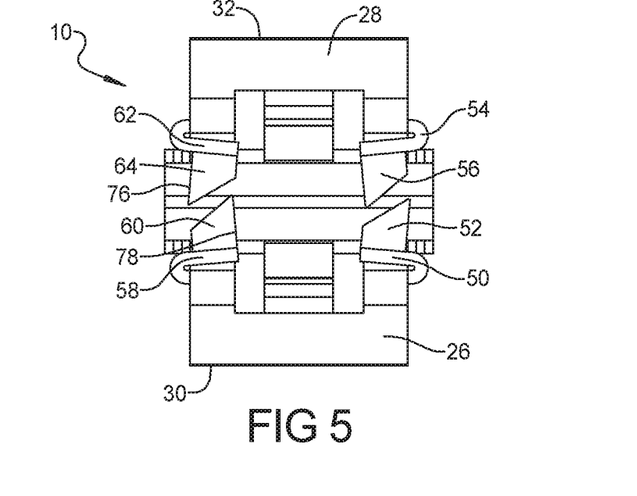
FIG. 5 is a top view of the fastener shown in FIG. 1.
Figure 6:
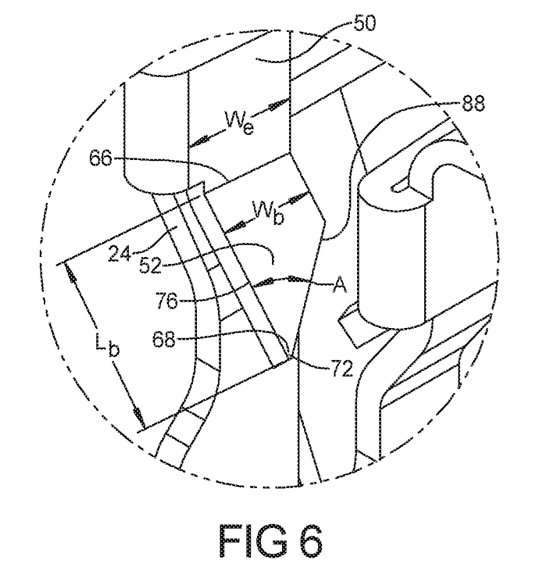
FIG. 6 is a magnified view of the barbs of the example fastener of FIG. 1.

As shown in FIGS. 2 and 6, the first barb 52 is connected to the body 12 of the fastener 10 by the first barb extension 50. The first barb extension 50 extends laterally away from the lateral side edge 24 of the first side 16. A portion of the barb extension 50 can be positioned laterally outside the lateral side edge 24. The first barb extension 50 then bends back toward the central cavity 14 of the body 12 such that a portion of the first barb extension 50 overlaps the inner surface of the adjacent first side 16. As such, the first barb extension 50 is folded so that it is disposed between the first side 16 and the second side 18 in the central cavity 14. As further shown in FIG. 2, the bent portion of the first barb extension 50 has a rounded or curved shaped so that the bent portion of the first barb extension 50 has a U-shape when viewed from the trailing end 22 of the body 12 as shown in FIG. 5. The bent portion of the first barb extension 50 can have other shapes or profiles as well. The bent portion of the first barb extension 50, in other examples, can have a V-shape or a rectangular shape or can be crimped such that it has a substantially flat profile.

Figure 4:
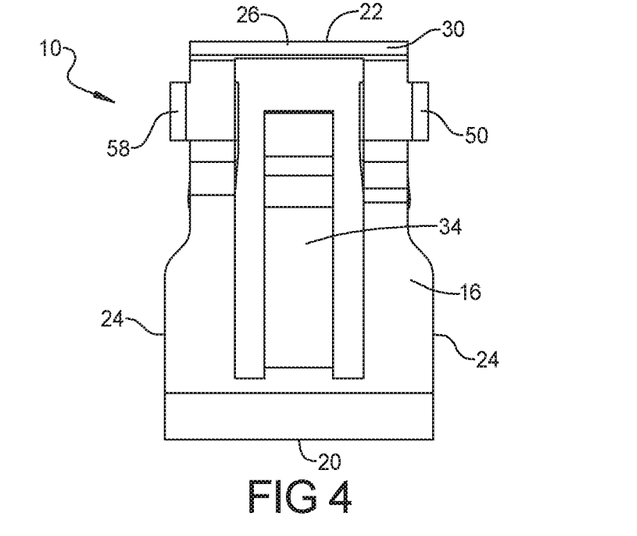
FIG. 4 is a front view of the fastener shown in FIG. 1.

As shown on FIG. 4, the lateral side edges 24 of the fastener 10 in this example are not linear when viewed from the front. The lateral side edges have an offset portion toward the trailing end 22. As can be seen, the lateral side edges 24 extend upward from the insertion end 20 along a first portion and then move inwardly toward the first spring arm 34 that is located at or near the center of the body 12. The opposite lateral side edge 24 follows the same profile such that the width of the body 12 is larger at the insertion end 20 than at the trailing end 22.

This profile of the body 12 advantageously results in a structure in which the barb extensions (50 and 58, in this example) located on opposite lateral sides of the fastener 10 do not project outward beyond the overall width of the body 12 at the insertion end 20. The maximum overall lateral distance between the first barb extension 50 and the third barb extension 58 is less than the maximum overall lateral width of the body 12 at the insertion end 20. In other examples, the overall lateral distance between opposing barb extensions can be equal to the overall lateral width of the body 12 at the insertion end 20. As can be appreciated, with this profile, the barb extensions do not contact or interfere with the insertion of the fastener 10 into the opening 86 since the outermost portions of the barb extensions are located laterally inward of the overall width of the body 12 at the insertion end 20.

The first barb extension 50, in this example, is joined to the first barb 52 at a bend 66 located toward the portion of the first barb extension 50 facing the insertion end 20 of the fastener 10. The first barb 52 is angled inward and away from the body 12 such that a distal end 68 of the first barb 52 extends into the central cavity 14. The second barb extension 58 and the second barb 60 can be similarly configured as shown in FIG. 2 such that the first barb 52 and the second barb 56 each extend outward from the first side 16 into the central cavity 14 are pointed toward the insertion end 20.

As previously discussed, the fastener 10 can also include the third barb extension 54, the third barb 56, the fourth barb extension 62 and the fourth barb 64 similarly configured and oppositely arranged on the second side 18 of the body 12. As can be appreciated, the first barb 52 and the third barb 56 are located opposite one another and the second barb 60 and the fourth barb 64 are located opposite one another. The distal ends of the opposing barbs can terminate at approximately the same vertical plane disposed along the center of central cavity 14 between and substantially parallel to the first side 16 and the second side 18.

In use, the rib 82 can be inserted into the central cavity 14 between the first side 16 and the second side 18. The rib 82 contacts and pushes past the barbs causing the barbs to engage and retain the rib 82. If the rib 82 is attempted to be removed from the central cavity 14, such movement of the inserted feature is resisted by the barbs. As can be appreciated, the distal ends of the barbs engage the surface of the rib 82 and prevent the rib 82 from being undesirably removed.

One example profile of the distal end 68 of the first barb 52 is shown in FIG. 6. In this example, the distal end 68 of the first barb 52 comes to a point 72. As also shown in FIGS. 5 and 6, the distal edge of the distal end 68 is angled and comes to the point 72 at a lateral outer edge 76 of the first barb 52. The third barb 56, in this example, is also pointed but a point 74 is located on a lateral inner edge 78 of the third barb 56. In this manner the respective points of the first barb 52 and the third barb 56 are positioned on opposite side edges of the barbs so that the points may overlap a vertical plane located at the center of central cavity 14 without contacting or interfering with each other.

Figure 7:
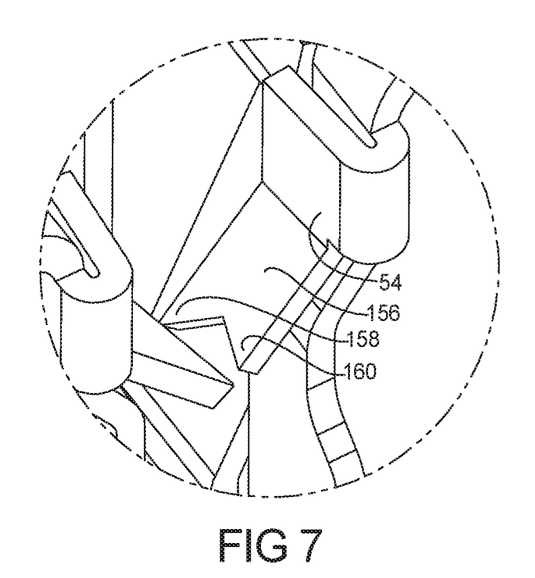
FIG. 7 is a magnified view of an alternative barb that can be used in accordance with the present disclosure.

In another example barb configuration, the barb can include two points. As shown in FIG. 7, example barb 156 includes two points. A first point 158 and a second point 160 are located at the side edges of the barb 156 and the distal edges of the barb 156 are angled toward one another and meet at the center of the barb 156. In this configuration, the barb 156 is V-shaped. The first point 158 and the second point 160 can extend outward and toward the insertion end 20 of fastener 10 and be of similar sizes and lengths. In other examples, the first point 158 and the second point 160 have different sizes and lengths.

Figure 8:
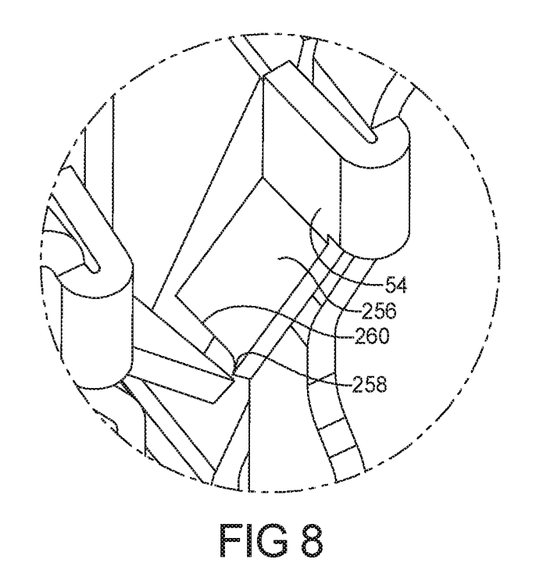
FIG. 8 is a magnified view of another alternative barb that can be used in accordance with the present disclosure.

In another example barb configuration, the barb can include a point and a flat section. As shown in FIG. 8, a barb 256 includes a point 258 and a flat section 260. In this example, the point 258 extends further downward and inward than the flat section 260. The flat section 260 extends across a portion of the width of the barb 256 in a substantially parallel relationship to the insertion end 20 of the fastener 10. In other examples, the flat section 260 runs at an angle such that it is not parallel to the insertion end 20. The point 258, in these other examples, still extends downward from the flat section 260. In still other example configurations of the barbs, variations of the foregoing specific examples can be used such as points located in different locations along the width of the barbs and points including rounded or flat ends.

In the example barbs shown in FIGS. 6-8, the barbs 52, 156, 256 have a width that is shown as less than the width of the first barb extension 50 or the third barb extension 54. Thus, a portion of the barb extension 50 can extend laterally beyond both the lateral side edge 24 of the body 12 and the lateral side edge 24 or the barb 52, 156, 256. As shown in FIG. 6, the width $W_e$ corresponds to the portion of the width of the first barb extension 50 that overlaps the first side 16 of the body 12. The width $W_b$ corresponds to the width of the barb 52. In other embodiments, the width of the first barb 52 can be substantially the same as the width of the first barb extension 50.

In existing designs, the barbs often include thin flat distal ends that are substantially parallel to an insertion edge of the fastener. This orientation disposes the thin distal edge of the barb essentially parallel to an outer surface of the rib being inserted into the fastener. This orientation and the designs of existing barbs can cause existing barbs to sink into the rib, resulting in existing fasteners becoming loose and permitting the relative movement of joined components. By orienting a portion of the distal edge of a relatively wide barb at an angle to the surface of the rib and/or by including a flat portion adjacent the point or such a relatively wide barb, as described in example barbs 52, 156 and 256, the surface area of the barb contacting the rib is increased. This results in a lower likelihood that the barb will problematically sink into or otherwise damage the rib and permit relative movement of joined components.

The example barbs according to the present disclosure have a width that is relatively larger than the width of existing barb designs when compared to the length of the barb. As shown in FIG. 6, for example, the width $W_b$ is the width of the barb 52 measured along the barb 52 from is lateral outer edge to its inner edge. The length $L_b$ is the length of the barb 52 measured from the bend 66 where the barb 52 is joined to the barb extension 50 to the point 72. In this example, the width $W_b$ is greater than one half of the length $L_b$. In other examples, the width of the barb can have other relative proportions to its length. In another example, the width $W_b$ can be greater than one third of the length $L_b$. In still other examples, the ratio of the width $W_b$ to the length $L_b$ of the barb can have values equal to or greater than ⅕ or ¼.

The example barb 52 has a width $W_b$ of 2.5 mm and a length $L_b$ of 2.3 mm. Other example barbs can have different widths and different lengths. Other examples of the size of the barb include a width $W_b$ of 1.0 mm with a length $L_b$ of 7.3 mm, a width $W_b$ of 1.3 mm with a length $L_b$ of 5.7 mm and a width $W_b$ 1.2 mm with a length $L_b$ of 6.0 mm.

As further shown in FIG. 6 and as described above, the example barb 52 is shaped with the point 72 located at the distal end 68. The point 72 is located at the intersection of the lateral outer edge 76 and a distal edge 88. The orientation of the lateral outer edge 76 relative to the distal edge 88 defines a barb angle A. The barb angle A, in the example shown is 45 degrees. In other examples, the barb angle A can have other sizes. In other examples, the barb angle A is in the range of 30 degrees to 90 degrees or in the range of 45 degrees to 90 degrees. In still another example, the barb angle A is in the range of 3.5 to 10 degrees.

Figure 9:
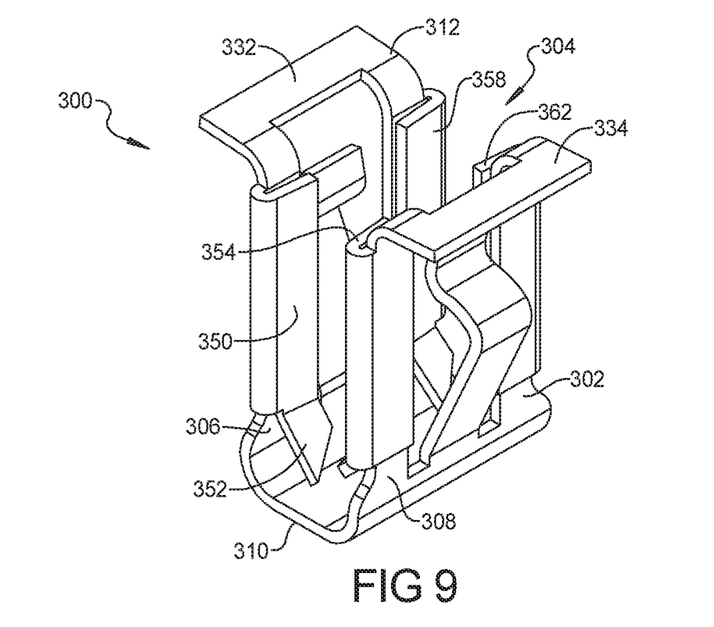
FIG. 9 is a perspective view of another example fastener in accordance with the present disclosure.
Figure 10:
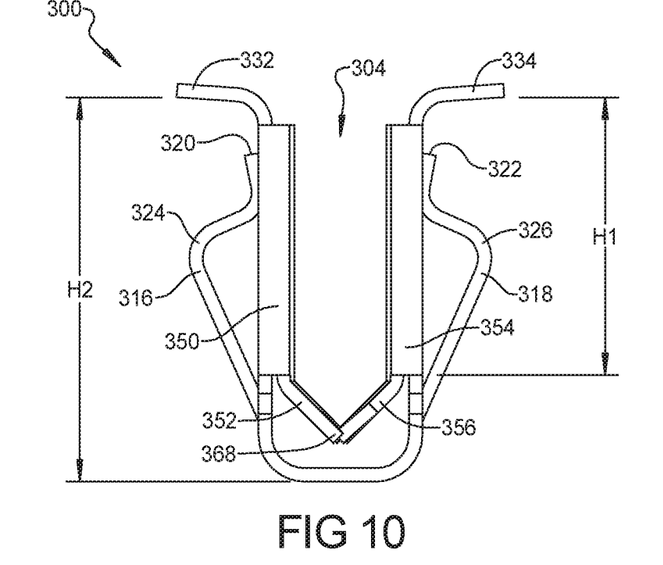
FIG. 10 is a side view of the fastener shown in FIG. 9.
Figure 11:
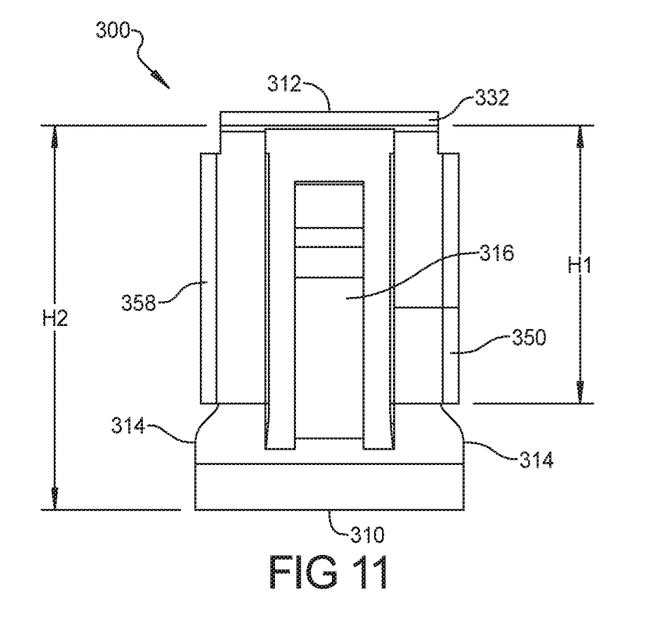
FIG. 11 is a front view of the fastener shown in FIG. 9.

FIGS. 9-11 show another example fastener 300. The fastener 300 is similar to fastener 10 in many respects but includes a barb configuration that is positioned closer to an insertion end 310. As shown, the fastener 300 includes a body 302 with a first side 306 and a second side 308. The first side 306 and the second side 308 are positioned parallel to each other to define a central cavity 304 and extend from the insertion end 310 to a trailing end 312. At the trailing end 312, the fastener 300 can include a first flange 332 and a second flange 334 that extend laterally across the first side 306 and the second side 308, respectively. The first flange 332 can extend orthogonally outward from the first side and the second flange 334 can extend orthogonally outward from the second side 308. The first flange 332 and the second flange 334, in this example, each extend away from the central cavity 304.

The fastener 300 can also include one or more spring arms. In the example shown, fastener 3000 includes a first spring arm 316 and a second spring arm 318. The first spring arm 316 and the second spring arm 318 are configured similarly to the first spring arm 34 and the second spring arm 36 of fastener 10. The first spring arm 316 and the second spring arm 318 extend away from the first side 306 and the second side 308, respectively, and away from the central cavity 304. The first spring arm 316 and the second spring arm 318 bend back toward the central cavity 304 at a first shoulder 324 and at a second shoulder 326. The first spring arm 316 and the second spring arm 318 then bend upwards toward the trailing end 312 of the fastener 300. The first spring arm 316 and the second spring arm 318 stop short of the first flange 332 and the second flange 334 at first terminating end 320 and at second terminating end 322, respectively.

As further shown in FIGS. 9-11, the fastener 300 can also include a first barb extension 350, a second barb extension 358, a third barb extension 354, a fourth barb extension 362, a first barb 352, a second barb 360, a third barb 356 and a fourth barb 364. As with the previously described example, each of the four barb extensions and each of the four barbs in the example fastener 300 are similar to one another. The first barb extension 350 and the first barb 352 are hereinafter described but it should be appreciated that the other barb extensions and the other barbs can have a similar structure be disposed on an opposite side of the fastener 300.

As shown, the first barb 352 is connected to the body 302 of the fastener 300 by the first barb extension 350. The first barb extension 350 extends laterally away from the lateral side edge 314 of the first side 306. The first barb extension 350 then bends back toward the central cavity 304 of the body 302 such that a portion of the first barb extension 350 overlaps the inner surface of first side 306. As such, the first barb extension 350 is disposed between the first side 306 and the second side 308 in the central cavity 304.

As further shown in FIG. 9, the bent portion of the first barb extension 350 has a rounded shaped so that the bent portion of the first barb extension 350 has a U-shape that extend laterally from and outside the lateral side edge. The bent portion of the first barb extension 350 can have other shapes or profiles as well. The bent portion of the first barb extension 350, in other examples, can have a V-shape or a rectangular shape or can be crimped such that it has a substantially flat profile.

As can be seen, the first barb extension 350 extends further downward along the first lateral side edge 314 from the first flange 332 than in the example fastener 10 previously described. The first barb extension 350 has a height, H1, as shown in FIGS. 10 and 11. In comparison, the first lateral side edge 314 has a height, H2. The heights, H1 and H2, are the vertical distances between the trailing end 312 and the insertion end 310 of the fastener 300 and an insertion end of the barb extensions, respectively. In the example shown in FIGS. 9-11, the height H1 is greater than half of the height H2. This configuration can dispose a distal end 368 of the first barb 352 at or below the vertical location where the first spring arm 316 begins to extend away from the first side 306.

In another example, the distal end 368 of the first barb 352 can be disposed inside the central cavity 304 at a vertical height between the location of the first shoulder 324 and the location where the first spring arm 316 begins to extend away from the first side 306. In another example, the distal end 368 of the first barb can be disposed inside the central cavity 304 at a vertical height between the location of the first shoulder 324 and the insertion end 310. In still another example, the relative size of the height H1 to that of H2 can be different from that described above. For example, as shown in the example fastener 10 on FIGS. 2-5, the height H1 can be less than half of the height H2.

Figure 12:
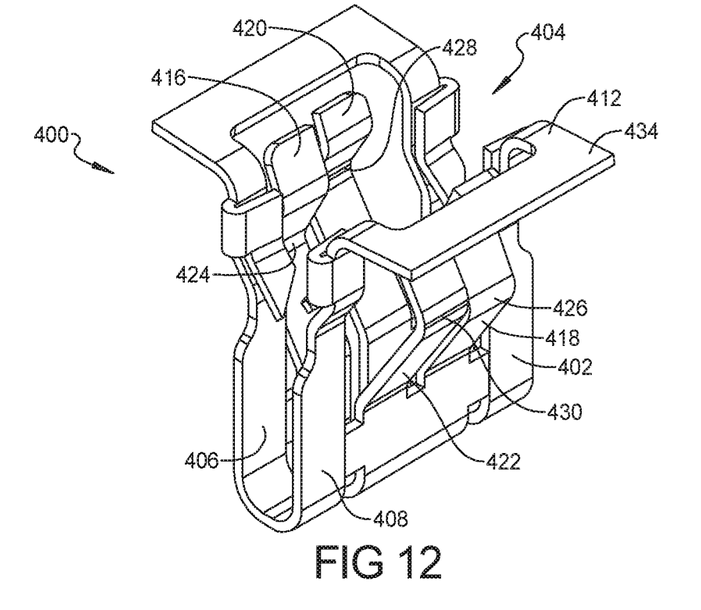
FIG. 12 is a perspective view of yet another example fastener in accordance with the present disclosure.
Figure 13:
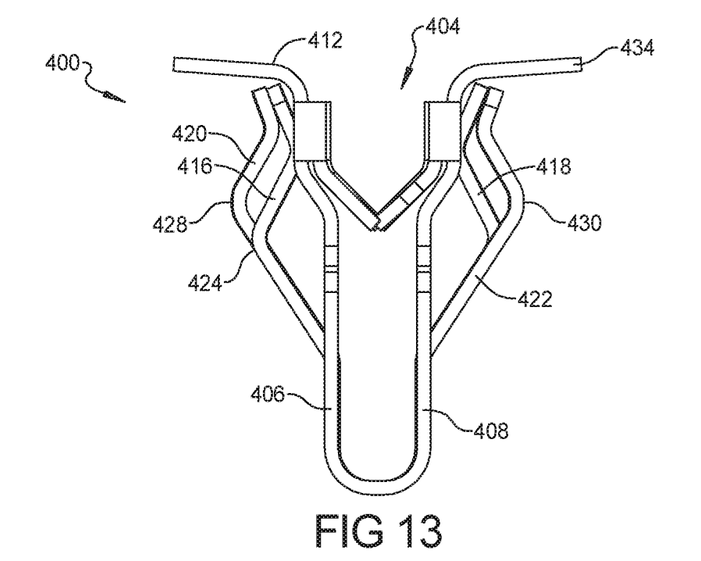
FIG. 13 is a side view of the example fastener of FIG. 12.

Still another example fastener 400 is shown in FIGS. 12 and 13. Many of the previously described features are similar in this embodiment. Fastener 400 includes a body 402, a central cavity 404, a first spring arm 416 and a second spring arm 418. In this embodiment, the fastener 400 also includes a third spring arm 420 and a fourth spring arm 422. The addition of the third spring arm 420 and the fourth spring arm 422 in this embodiment permits the fastener 400 to have the additional flexibility of being compatible with a wider variety of components since the additional spring arms permit fastener 400 to secure to a wider range of material thicknesses.

As shown in FIGS. 12 and 13, the first spring arm 416 and the third spring arm 420 can extend outward from a first side 406 toward a trailing end 412 of the fastener 400. The second spring arm 418 and the fourth spring arm 422 can similarly extend outward toward the trailing end 412 but extend from a second side 408. The second spring arm 418 and the fourth spring arm 422 can extend outward before bending back toward the second side 408 at a second shoulder 426 and a fourth shoulder 430, respectively. The second shoulder 426 and the fourth shoulder 430 can be located below a flange 434 at the trailing end 412 of the second side 408. The vertical distances between the flange 434 to the second shoulder 426 and to the fourth shoulder 430 are different. This configuration of the fastener 400 permits it to be used with multiple different second components having different material thicknesses.

The first spring arm 416 and the third spring arm 420 are located on the first side 406. The first spring arm 416 and the third spring arm 420 are similarly configured as previously described with a first shoulder 424 and a third shoulder 428. With this configuration, the first spring arm 416 and the third spring arm 420 are able to accommodate the same variety of material thickness as the second spring arm 418 and the fourth spring arm 422.

In this embodiment, the first spring arm 416 and the second spring arm 418 are positioned laterally offset from one another as shown in FIG. 12. The third spring arm 420 and the fourth spring arm 422 are also laterally offset from one another. In this manner, the retention forces provided by the complimentary spring arms are laterally distributed across the second component so that rotation or twisting of the fastener 400 is minimized.

The fasteners of the present disclosure, including fasteners 10, 300 and 400, are made of a suitable material such that various elements of the fastener can flex, bend or elastically deform to provide the functionality as previously described. In some circumstances, the resilient nature of the fasteners can be enabled if the fastener is made of a suitable spring steel. In other circumstances, however, the fasteners of the present disclosure can be most suitably made of other metals or alloys.

Example embodiments are provided so that this disclosure will be thorough, and will fully convey the scope to those who are skilled in the art. Numerous specific details are set forth such as examples of specific components, devices, and methods, to provide an understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing descriptions of the example embodiments and example applications have been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A resilient U-base fastener comprising:
    a U-shaped body defining a central cavity between a first side and a second side, the first side connected to the second side at an insertion end, the first side having a first outer lateral side edge and a second outer lateral side edge and the second side having a third outer lateral side edge and a fourth outer lateral side edge;
    a first barb extension extending laterally outwardly from the first outer lateral side edge and being bent laterally inwardly to support a first barb in the central cavity, wherein the first barb extends from the first barb extension and into the central cavity and toward the insertion end and at least a portion of the first barb is positioned between the first outer lateral side edge and the second outer lateral side edge of the first side;
    a second barb extension extending laterally outwardly from the second outer lateral side edge and being bent laterally inwardly to support a second barb in the central cavity, wherein the second barb extends from the second barb extension and into the central cavity and toward the insertion end and at least a portion of the second barb is positioned between the first outer lateral side edge and the second outer lateral side edge of the first side; and
    a first spring arm connected to the body adjacent to the insertion end and extending from the insertion end and away from the central cavity.

2. The resilient U-base fastener of claim 1 further comprising a first flange connecting the first outer lateral side edge to the second outer lateral side edge at a trailing end of the body opposite the insertion end, wherein the first barb has a distal end disposed away from the first side, the distal end positioned closer to the insertion end than to the trailing end.

3. The resilient U-base fastener of claim 1 wherein the first barb has a distal end away from the first side, the distal end having a point.

4. The resilient U-base fastener of claim 3 wherein the distal end of the first barb has a flat portion next to the point.

5. The resilient U-base fastener of claim 3 wherein the distal end of the first barb has a flat portion adjacent the two pointed projections.

6. The resilient U-base fastener of claim 1 wherein the first barb has a distal end away from the first side, the distal end having two pointed projections.

7. The resilient U-base fastener of claim 6, wherein the two pointed projections of the first barb have different lengths.

8. The resilient U-base fastener of claim 1 wherein the first spring arm bends back toward the first side at a first shoulder, wherein the first barb has a distal end disposed away from the first side, the distal end positioned between the first shoulder and the insertion end.

9. The resilient U-base fastener of claim 1 wherein the first barb extension has a first height H1 measured along the first outer lateral side edge, and the body has a second height H2 measured along the first outer lateral side edge, the first height H1 being greater than one half of the second height H2.

10. The resilient U-base fastener of claim 1 wherein the first barb extension has a first height H1 measured along the first outer lateral side edge and the body has a second height H2 measured along the first outer lateral side edge, the first height H1 being less than one half of the second height H2.

11. The resilient U-base fastener of claim 1 further comprising:
    a third barb extension extending laterally outwardly from the third outer lateral side edge of the second side and being bent laterally inwardly to support a third barb in the central cavity, wherein the third barb extends from the third barb extension and into the central cavity and toward the insertion end and at least a portion of the third barb is positioned between the third outer lateral side edge and the fourth outer lateral side edge of the second side; and
    a fourth barb extension extending laterally outwardly from the fourth outer lateral side edge of the second side and being bent laterally inwardly to support a fourth barb in the central cavity, wherein the fourth barb extends from the fourth barb extension and into the central cavity and toward the insertion end and at least a portion of the fourth barb is positioned between the third outer lateral side edge and the fourth outer lateral side edge of the second side.

12. The resilient U-base fastener of claim 1 wherein the first barb extension has a curved portion that extends past the first outer lateral side edge before bending back to overlap the first side inside the central cavity.

13. The resilient U-base fastener of claim 1 wherein the first barb has a length and a width, the width being greater than one half of the length.

14. The resilient U-base fastener of claim 1 wherein the first barb has a length and a width, the width being greater than one third of the length.

15. The resilient U-base fastener of claim 1 having a barb extension width measured as a maximum overall lateral distance between the first barb extension and the second barb extension and having an insertion end width measured as a maximum overall lateral width of the insertion end of the U-shaped body, wherein the barb extension width is less than or equal to the insertion end width.

16. The resilient U-base fastener of claim 15 wherein the first outer lateral side edge and the second outer lateral side edge are non-linear and portions of the first outer lateral side edge and the second outer lateral side edge are laterally inwardly offset such that the first barb extension and the second barb extension do not laterally outwardly extend beyond an insertion end width of the insertion end of the U-shaped body.

17. A resilient U-base fastener comprising:
- a U-shaped body defining a central cavity between a first side and a second side, the first side connected to the second side at an insertion end;
- a first pair of barb extensions extending laterally outwardly from opposite outer lateral side edges of the first side, the first pair of barb extensions being bent laterally inwardly to support a first pair of barbs extending in the central cavity from the first pair of barb extension;
- a second pair of barb extensions extending laterally outwardly from opposite outer lateral side edges of the second side, the second pair of barb extensions being bent laterally inwardly to support a second pair of barbs extending in the central cavity from the first pair of barb extensions;
- a first spring arm connected to the body adjacent to the insertion end and extending from the first side and away from the central cavity; and
- a second spring arm connected to the body adjacent to the insertion end and extending from the second side and away from the central cavity.

18. The resilient U-base fastener of claim 17 wherein the first spring arm is disposed between the first pair of barbs.

19. The resilient U-base fastener of claim 17 wherein the first pair of barb extensions include folded portions, the folded portions causing the first pair of barb extensions to overlap a portion of the first side inside the central cavity.

20. The resilient U-base fastener of claim 17 wherein an overall lateral distance between the first pair of barb extensions is less than or equal to a maximum width of the U-base fastener.

* * * * *

UNITED STATES PATENT AND TRADEMARK OFFICE
CERTIFICATE OF CORRECTION

PATENT NO. : 10,704,577 B2
APPLICATION NO. : 15/787288
DATED : July 7, 2020
INVENTOR(S) : Steven M. Benedetti It is certified that error appears in the above-identified patent and that said Letters Patent is hereby corrected as shown below:

In the Claims

Column 12, Claim 17, Lines 2-3, delete "extension;" and insert --extensions;-- therefor Signed and Sealed this
Twenty-seventh Day of August, 2024

Katherine Kelly Vidal
*Director of the United States Patent and Trademark Office*